United States Patent Office 3,650,998
Patented Mar. 21, 1972

3,650,998
HYDROXY-FUNCTIONAL HYDROPHYLIC RESINS BASED ON COPOLYMERS OF MONOVINYL AROMATIC COMPOUND AND HYDROXY-FUNCTIONAL MONOMER
Kazys Sekmakas and Edward A. Gauger, Jr., Chicago, and Lester A. Henning, Arlington Heights, Ill., assignors to Desoto, Inc., Des Plaines, Ill.
No Drawing. Continuation-in-part of applications Ser. No. 615,048, Feb. 10, 1967, and Ser. No. 634,480, Apr. 28, 1967. This application Oct. 17, 1968, Ser. No. 768,549
The portion of the term of the patent subsequent to Nov. 30, 1988, has been disclaimed
Int. Cl. C08f *19/02, 27/12;* C23b *13/00*
U.S. Cl. 260—21
18 Claims

ABSTRACT OF THE DISCLOSURE

Hydroxy-functional hydrophylic resins dispersible in water with the aid of a base are based on copolymers such as styrene-allyl alcohol copolymers. These copolymers are partially esterified with drying oil fatty acid and then reacted with a monoanhydride to generate carboxy functionality. A portion of the carboxy functionality is consumed by reaction with an epoxide such as butylene oxide. The resins are dispersible in water with the aid of a base at low acid number.

---

The present application is a continuation-in-part of our prior applications Ser. No. 634,480, filed Apr. 28, 1967, now U.S. 3,516,913, and Ser. No. 615,048, filed Feb. 10, 1967.

The present invention relates to hydroxy-functional hydrophylic resins which are dispersible in water with the aid of a base and which may be electrodeposited at the anode of a unidirectional electrical system.

While various water dispersible resinous materials are known to be useful in electrocoating systems, these generally possess poor electrocoating characteristics or poor film properties and more frequently are deficient in both respects. This is particularly true when corrosion-resistant pigments are not selected and when the properties of the cured electrodeposited film are required to conform to the rigid standards of corrosion and detergent resistance which are frequently expected of solvent-based coatings. In this regard water dispersible resins can normally be dissolved in organic solvent and deposited from solvent solution without electrical deposition. The properties of an electrodeposited film are usually markedly inferior when compared with the same resin deposited in conventional fashion from solvent solution.

In accordance with the invention, an hydroxy-functional addition polymer containing a large proportion of styrene or similar monovinyl aromatic compound is reacted with a flexibilizing monocarboxylic acid to introduce flexibilizing hydrocarbon chains without consuming all of the hydroxy functionality of the addition polymer. The hydroxy-functional polymer ester so produced is then reacted with a polycarboxylic acid comprising a single dicarboxylic anhydride group, especially trimellitic anhydride. The reaction is an addition reaction between the hydroxy of the polymer ester and the anhydride of the polycarboxylic acid and the result is to introduce carboxylic acid groups for water dispersibility. On the other hand, and to provide a product which can be effectively electrocoated in the invention, an epoxide, preferably a monoepoxide, is reacted with the acidic polymer ester to consume a portion of the carboxyl groups which have been introduced and this provides an hydroxy-functional hydrophilic product which is easily dispersed in water with the aid of a base and which can be electrodeposited to provide uniquely superior film properties.

Not only are the film properties remarkably excellent, but important electrocoating characteristics such as stability of the dispersed polymer in the alkaline bath and throwing power are also excellent. Not to be overlooked from the standpoint of a contribution to the art is the further fact that the resin system involved is even less expensive than the better competitive systems which still cannot match the throwing power and film properties obtained by the invention.

Referring more particularly to the addition polymers which are selected to constitute the backbone of the resins used herein, the essential factors involved are polymer linearity, low to moderate molecular weight as results from solution polymerization, the presence of styrene or the like and the presence of an hydroxy-functional monoethylenic monomer. The remainder of the copolymer, if any, is generally constituted by monoethylenically unsaturated monomers which do not interfere, especially lower alcohol esters of acrylic acid or vinyl acetate and the like. The monoethylenic monomers which can be tolerated in addition polymers intended to be dispersed in water are well known in the art and are not, per se, a primary feature of this invention.

On the other hand, a substantial part of the addition polymer, desirably at least 15% by weight, and more preferably at least 40% by weight of the polymer is constituted by styrene or vinyl toluene and $C_1$–$C_4$ alkyl and halogen substitution products thereof. The presence of styrene or like monovinyl aromatic compound in the polymer is important to provide a resin which possesses superior resistance to saponification in the aqueous alkaline medium which constitutes the electrocoating bath. It should be here noted that the resin may remain in the bath for weeks or months and that, moreover, the invention preferably employs highly alkaline baths, e.g., a pH of over 8.4, preferably over pH 9.0 since this aids resin dispersion and throwing power.

A significant proportion of aromatic monomer is used despite the normally poor water dispersibility of polymers containing the same and this is an important feature of the invention. The poor properties of styrene copolymers in aqueous medium is overcome per this invention by the generation of carboxyl and hydroxyl functionality remote from the polymer backbone. This is especially significant in the low acid value electrocoat systems of this invention.

Interestingly, the preferred high bath pH should be compared with the desire to deposit detergent resistant films. The presence of alkali in the final film is obviously antagonistic to good detergent resistance and it is a feature of the invention to deposit superior films at high bath pH. Moreover, the deposited films are highly resistive despite deposition from a high pH bath as manifested by the production of thin films at high voltage.

Continuing with the composition of the addition polymer, any monoethylenically unsaturated hydroxy-functional monomer may be used to provide the desired hydroxy functionality, proportions of from 5%–50% by weight of the polymer being broadly suitable, and preferred proportions being from 10%–35%. Typical hydroxy monomers which may be used are 2-hydroxy ethyl acrylate, 2-hydroxy propyl acrylate, 2-hydroxy propyl butyl maleate, 2-hydroxy ethyl methacrylate, 2-hydroxy propyl methacrylate, 2-hydroxy methyl-5-norbornene, allyl alcohol, 2-hydroxy ethyl crotonate, 2-hydroxy propyl crotonate and crotyl alcohol.

Only reasonable precautions need be taken to exclude large amounts of monomers which will impair water dispersibility or which will interfere with the desired reactions.

Polymers adapted to be dispersed in water with the aid of a base generally cannot contain too large a proportion of long chain ester so that as soon as we require a significant proportion of styrene or like monomer which has a hardening influence to be present, it is preferred, though not essential, to provide for additional plasticization of the polymer. For this reason from 5%–95% of the hydroxy groups available, preferably from 20%–80%, are consumed by reaction with monocarboxylic fatty acid. The acids can be saturated or unsaturated and preferably would have a chain length of from 6–20 carbon atoms. Oil fatty acids including drying, semi-drying and non-drying oil fatty acids can be selected. Curiously, the proximity of the hydrocarbon chain to the ester group and the fact that water dispersibility in the invention is achieved through functional groups remote from the polymer backbone appears to permit the long hydrocarbon chains to be used without preventing water dispersibility. Moreover, this is true despite the low acidity of preferred resins in this invention. Typical monocarboxylic acids, e.g., fatty acids, which may be used in accordance with the invention are illustrated by soya fatty acids, linseed fatty acids, castor oil fatty acids and the like. While the shorter chain acids such as hexoic acid are less preferred, they can be used.

Since the monocarboxylic acid is intended to be fully incorporated into the polymer, the esterification reaction is continued to an acid number of less than 15, preferably less than 10. Since residual hydroxy is desired, the monocarboxylic acid is used in stoichiometric deficiency with respect thereto.

The polymer esters which are produced as described are hydroxy-functional products and it is necessary to introduce carboxyl functionality in order to provide the dispersibility in aqueous alkaline medium which is needed in accordance with the invention. Accordingly, the ester obtained by the reaction of monocarboxylic acid with hydroxy-functional polymer is then reacted with a polycarboxylic acid anhydride such as trimellitic anhydride. The point is that the acid selected should contain a single anhydride group and, preferably also, at least one further carboxylic acid group. As a result, the single anhydride group can react with at least a portion of the remaining hydroxy groups in the polymer to thereby generate a carboxyl group and with no danger of gelation since the single anhydride group will react easily under conditions under which the carboxyl group does not react rapidly. Using trimellitic anhydride as an illustration, the anhydride group reacts to bind the trimellitic moiety to the polymer and, for each such reaction, there are two carboxyl groups provided in the resin, one being the carboxyl group originally present in the trimellitic anhydride compound and the second being generated by reaction of the anhydride group.

As will be evident, other monoanhydrides such as phthalic anhydride and succinic anhydride may be utilized, but trimellitic anhydride is especially valuable from the standpoint of producing saponification-resistant products and is preferred for this reason and also for the further reason that a single trimellitic anhydride molecule generates a pair of carboxylic acid groups. Still other anhydrides which can be used are maleic anhydride, and hexahydrophthalic anhydride. It is to be especially noted that adduction of the maleic moiety to any unsaturation which may optionally be present is not intended since this would gel the product if the anhydride group is also reacted with the hydroxy group. Adduction used alone would not provide the hydrolytic stability in the alkaline bath desired by the invention. A trifunctional monoanhydride which has been made available recently and which can be used is α-(2-carboxyethyl)-glutaric anhydride.

Sufficient trimellitic anhydride or other anhydride should be utilized to provide an acid number of at least 25, preferably from about 40 to about 120 and most preferably in the range of from 50 to 100.

The carboxyl-functional material produced as aforesaid is then reacted with an epoxide, preferably a monoepoxide to reduce the acidity and produce an hydroxy ester. Preferred practice of the invention reduces the acidity to the range of from 12–25, but at least some of the advantage of the invention is achieved to the extent that the monoepoxide is used and to the extent that excessive acidity is consumed thereby. Acid numbers as high as 70 illustrate least preferred practice of the invention, but it is stressed that there are important features of the invention achieved at acid numbers less than 30 which cannot be practically duplicated at higher acid numbers. The reduced acid values relied upon in the present development not only provide coatings which are far less sensitive to water, but the conductivity of the film is reduced so that excessively thick films are not deposited and it is a feature of the invention to achieve adequate colloidal dispersibility in water with such a low acid number. The utilization of linear polymers made flexible by esterification with monoacid and the availability of hydroxy and carboxyl functionality remote from the polymer backbone, enables the small proportions of acid which are relied upon herein to provide adequate dispersion of the condensation product in aqueous medium using a base, such as organic amine or ammonia.

While monoepoxides are preferably used, since these are effective to reduce acidity and generate hydroxy groups remote from the polymer backbone with minimum danger of gelation, it will also be appreciated that small amounts of polyepoxide, e.g., a bisphenol-based diepoxide of low molecular weight, can be used either alone or in admixture with the monoepoxide. However, the proportion of its use must be restricted to avoid gelation.

With respect to the monoepoxide used to generate hydroxy ester groups, any monoepoxide can be used which is free of functional groups which would interfere with the reaction between the carboxy-functional intermediate and the monoepoxide. The preferred monoepoxides are the $C_2$–$C_4$ monooxides such as ethylene oxide, propylene oxide, and butylene oxide. The low molecular weight aliphatic compounds are superior from the standpoint of water solubility. However, styrene oxide can be used though it is less preferred. Also, higher molecular weight monoepoxides can be used, but these are, again, less preferred.

On the other hand, alpha-branched saturated monocarboxylic acids and especially tertiary fatty acids in the form of a glycidyl ester are quite good and have been found to be of unique value in providing reactive hydroxy esters which are fully compatible with water and which help to provide desirable physical properties in the final resin product. These have the formula:

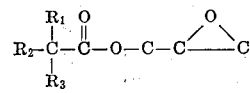

in which $R_1$ and $R_2$ are alkyl radicals having a chain length of from 2–18 carbon atoms and $R_3$ is the same as $R_1$ and $R_2$ or hydrogen. The compound in which $R_1$, $R_2$ and $R_3$ are all alkyl radicals containing from 9–11 carbon atoms is identified as tertiary glycidyl ester A and is used in some of the examples hereinafter.

The reaction with monoepoxide is easily carried out at moderate temperatures and the reaction quickly goes to substantial completion without gelation. Appropriate temperatures are in the range of 150–350° F., preferably from 200–300° F. Accordingly, the epoxide must be used in stoichiometric deficiency with respect to the acid groups which are available. A small amount of an amine or other alkaline material is advantageously used in order to promote the carboxy-epoxy reaction. The stoichiometric deficiency is usually at least 5%, preferably from 50–90%, depending upon the acidity which has been introduced and the desired final acidity. The consumption of the carboxyl groups which have been provided is easily followed by observing the acid number of the product as it is produced.

The final acid value has been discussed previously and should broadly be in the range of about 8 to about 70, with better results being obtained at acid values below 50, and with best results being obtained in the range of from 12–25. It is quite surprising to find that polymers containing such a large proportion of styrene and fatty acid ester can be stably dispersed in water with such little acidity available.

It will be observed that the epoxide reaction generates an hydroxy ester group and that there may be hydroxy functionality remaining from the initially used addition polymer. Products having an hydroxy functionality expressed by an hydroxy number in excess of 30, preferably at least 50, are preferred.

The resins used can be applied clear or pigmented. The examples herein deposit clear films to minimize extraneous factors. In normal practice, these resins are frequently pigmented, the pigment being incorporated in the water free resin solution. Normal pigmentation is illustrated by titanium dioxide rutile incorporated by simple ball milling. A typical pigment to binder ratio is substantially 0.4:1, though this ratio may vary from 0.1:1 to 1:1 or higher, with values of 0.3:1 to 0.5:1 being more usual. The only caution to be observed is to avoid those pigments which are unduly sensitive to water. Corrosion resistant pigments may be used, but this is not essential.

The acidic hydroxy esters of the invention can be cured by themselves, but a superior cure can be obtained in combination with aminoplast resins. The term "aminoplast resins" is a common one used to define heat-hardening condensation products of amines and especially triazines with excess formaldehyde. Condensation products of excess formaldehyde with melamine, benzoguanamine, and urea constitute typical aminoplast resins and the hydroxy esters of the invention exhibit good compatibility with such materials. The condensation reaction, as is well known, is normally carried out in alcoholic solvent medium, such as methanol, ethanol, butanol or higher alcohol. Broadly, the aminoplast helps the cure when used in water soluble or water dispersible form and proportions of 1–50%, preferably 5–40%, based on total resin, are used to form films which cure more extensively and at lower temperature. Water insoluble aminoplast resins are particularly preferred in accordance with the invention, e.g., benzoguanamine-formaldehyde condensates.

The hydrophylic resins of the invention are desirably supplied in the form of a solution in the water miscible organic solvent, these being preferably used in an amount of at least 12% by weight, desirably at least 20% by weight of water miscible organic solvent, based on the weight of the resins which are dispersed in the water phase. The preferred solvents are: dioxane, ethanol, isopropanol, 2-ethoxy ethanol, methyl ethyl ketone, 2-ethoxy ethanol acetate, propyl alcohol, butoxy ethanol, 2-ethoxy diethylene glycol, 2-butoxy diethylene glycol, etc.

The specific nature of the nitrogenous base which is selected to aid solubility is not a primary feature of the invention. Ammonia is a useful nitrogenous base, but aliphatic amines are preferred. These aliphatic amines are illustrated by monomethyl amine, dimethyl amine, diethyl amine, triethyl amine and morpholine. The proportion of the nitrogenous base is determined by the pH which is desired in the electrodeposition bath. Even inorganic bases such as sodium hydroxide are broadly useful though less preferred.

While the resins of the invention can be dispersed in water with the aid of a base to provide an aqueous dispersion which can be applied in various ways, application by electrodeposition is a particular feature of the invention. The electrodeposition process is a conventional one in which a unidirectional electrical current is passed through the bath to cause deposition on the anode. In this process the aqueous dispersion, pigmented or not as desired, is formulated to contain from 1–20% of resin solids, preferably from 5–15% and the pH of the bath can vary widely from a pH of 6 or higher as required for stable dispersion. The invention functions particularly well at the higher pH's of 8.5 and higher, a pH of up to about 10 being practicable. The preferred bath pH is from 8.5 to 9.6. At these higher pH's, the throwing power of the system is better and the stability of the system is better. The exceptional hydrolytic stability of the styrene-containing addition polymers with respect to which the acid groups are bound by ester groups, provides importantly superior hydrolytic stability. Also, and possibly because of the large proportion of styrene in the backbone of the polymer and the small proportion of acid which is utilized for dispersion in water, the final film properties are remarkably similar to those which can be obtained from solvent-based coating systems.

The films deposited in accordance with the invention are baked to cure the same. In the absence of an aminoplast resin, baking temperatures of approximately 350° F. and higher are desirably used in order to achieve a measure of cure by reaction between the carboxyl and hydroxy functionalities present in the resin. The hydroxy groups may also condense with one another in the presence of the carboxyl groups. In the presence of an aminoplast resin, the baking temperatures which may be used are lowered and a more extensive cure is possible. Appropriate baking temperatures are from 200–500° F. for periods varying from about 30 seconds at the highest baking temperatures to about an hour at the lowest temperatures.

The invention is illustrated in the following examples.

EXAMPLE 1.—PREPARATION OF ILLUSTRATIVE RESIN

| | Parts by wt. | |
|---|---|---|
| Dioxane | 1,000 | Charge dioxane to reactor and heat to 105–110° C. |
| Styrene | 500 | Premix and add slowly to reactor over a 2½ hour period while maintaining temperature at 105–110° C. After addition is completed hold at temperature for one hour. |
| Butyl acrylate | 1,200 | |
| Hydroxy ethyl methacrylate | 300 | |
| Azobisbutyronitrile | 40 | |
| Tertiary butyl perbenzoate | 5 | Hold for one hour and then add. |
| Do | 5 | Hold for an additional hour and then add. |
| Dibutyl tin oxide | 1 | Add and hold until sample of resin is clear at room temperature, and an acid value of 48–50 is obtained (normally about 2 hours). |
| Trimellitic anhydride | 290 | |
| Triethyl amine | 30 | Add to reactor over a half-hour period and hold until an acid value of 16–18 is obtained. |
| Butylene oxide | 180 | |

Final resin characteristics:

Solids (percent)—71.0
Viscosity (Gardner-Holdt)—Z6++
Acid value—17.8

EXAMPLE 2.—PREPARATION OF ILLUSTRATIVE RESIN

| | Parts by wt. | |
|---|---|---|
| Styrene-allyl alcohol copolymer (6% by weight hydroxy) | 1,200 | Charge into reactor. Equivalent ratio copolymer hydroxy to fatty acid carboxyl is 2:1. |
| Castor oil fatty acids | 600 | Set trap with xylol. Heat to 220-225° C. and |
| Xylene | 50 | hold for an acid value of 4-6. Distill off xylene. |
| Methyl ethyl ketone | 330 | Add methyl ethyl ketone. |
| Dibutyl tin oxide | 1 | Cool to 110° C. and then add these two materials. |
| Trimellitic anhydride | 270 | Hold at 105-110° C. for an acid value of 74-76. |
| Trimethyl amine | 40 | Add trimethyl amine. |
| Butylene oxide | 145 | Add butylene oxide over a 30 minute period at 100-110°C. Hold for an acid value of 18-21. |
| 2-ethoxy ethanol | 300 | Add to solids content of 78.06. |

Final resin characteristics:

Solids—78.06%
Viscosity—Z2−
Acid value—19.7

EXAMPLE 3

Example 2 is repeated using a corresponding proportion of the tertiary glycidyl ester A referred to hereinbefore in place of the butylene oxide used in said Example 2. A resin of corresponding characteristics is obtained.

The resins described in the foregoing examples are each dispersed in water with the aid of a base to provide a 10% solids dispersion using triethyl amine as the base with sufficient amine being used to provide a pH of approximately 9.8. Electrodeposition utilizing a voltage of 200 volts deposits a film at the anode having a thickness of about 1.1 mils which is cured by baking for 20 minutes at 400° F. The coating is smooth, uniform, and strongly adherent to the panel on which it is deposited, zinc phosphate-treated steel panels being the usual base. The cured film is reasonably solvent resistant and flexible and forms a highly useful coating.

The electrocoating bath is preferably formed by having a portion, e.g., 30%, of the resin solids replaced by an aminoplast resin. The preferred aminoplast resins are water-insoluble and illustrated by the following benzoguanamine resin. The benzoguanamine resin utilized is a water-insoluble, heat-hardening condensate of benzoguanamine with a stoichiometric excess of formaldehyde. The product is produced by reacting 750 grams of n-butyl Formcel (40% formaldehyde, 51.5% n-butanol and 8.5% water), 630 grams benzoguanamine, and 412 additional grams of n-butanol. The mixture is heated with agitation to 195-200° F. which is maintained for 10-15 minutes until all of the benzoguanamine has dissolved. The pH is adjusted to 4.3-4.5 using a 10% aqueous formic acid solution (approximately 50 milliliters are needed). The temperature is then raised to 203-206° F. to distill n-butanol which is returned as reflux until water (not returned) is no longer generated. After water is no longer generated, butanol is collected in an amount equal to the volume of water which had been collected. The product is then thinned with 310 grams xylene and 135 grams n-butanol and is filtered.

Utilizing the modified electrocoating bath in which 30% of the resin solids are the above benzoguanamine resin, the application of 200 volts causes the deposition of a uniform film having a thickness of .7-.8 mils and an excellent cure is easily obtained by baking the film for 30 minutes at 325° F. The baked film exhibits excellent corrosion and detergent resistance as illustrated by the fact that the films pass tests such as immersion in 1% aqueous Tide solution at 165° F. for 144 hours and 5% salt spray conducted for 500 hours.

The hydrolytic stability of the electrocoating bath is unusually superior. This is illustrated by testing a copolymer prepared as described in Example 2 having a final acid value of 19.3 in an aqueous system containing 11.1% resin solids at a pH of 9.5 and maintained at 100° F. with agitation. This system showed substantially no increase in acidity with the passage of time. After 21 days, the acidity had increased from the initial value of 19.3 to only 19.5. After 64 days, the acidity of the system was only 20.8. Conducting the same test at 130° F., the acidity after 64 days was only 22. This indicates remarkably excellent resistance to degradation under the severe conditions noted.

The invention is defined in the claims which follow.

We claim:

1. Hydroxy-functional hydrophylic resin dispersible in water with the aid of a base comprising a linear addition polymer comprising at least 15% by weight of monovinyl aromatic compound, from 5-50% by weight of monoethylenically unsaturated hydroxy-functional monomer and the balance of said addition polymer consisting essentially of copolymerizable monoethylenically unsaturated monomers, hydroxy-functionality of said addition polymer being reacted with polycarboxylic acid monoanhydride to provide an acidic derivative having an acid number of at least 25, the carboxy functionality of said acid derivative being reduced by reaction to substanial completion without gelation with a stoichiometric deficiency of monoepoxide to provide a final product having an acid number in the range of from about 8 to about 70.

2. Resin as recited in claim 1 in which said addition polymer is reacted with a stoichiometric deficiency of monocarboxylic fatty acid to substantially consume said fatty acid prior to reaction with said monoanhydride.

3. Resin as recited in claim 2 in which from 20-80% of the hydroxy groups available in said addition polymer are reacted with said monocarboxylic fatty acid.

4. Resin as recited in claim 3 in which said monocarboxylic acid is a drying oil fatty acid and said monoanhydride is not copolymerizable with the unsaturation thereof.

5. Resin as recited in claim 1 in which said monovinyl aromatic compound is selected from the group consisting of styrene and vinyl toluene.

6. Resin as recited in claim 1 in which said monovinyl aromatic compound is present in an amount of at least 40% by wegiht.

7. Resin as recited in claim 1 in which said monoepoxide is selected from the group consisting of ethylene oxide, propylene oxide, butylene oxide and glycidyl esters of tertiary monocarboxylic acid.

8. Resin as recited in claim 1 in which said acidic derivative has an acid number of from about 40 to about 120, and the final product has an acid number of less than 50.

9. Resin as recited in claim 8 in which said final product has an acid number of from 12-25.

10. Resin as recited in claim 9 in which said monovinyl aromatic compound is styrene and said addition polymer further comprises lower alcohol ester of acrylic acid.

11. Resin as recited in claim 1 in which said monoanhydride is trimellitic anhydride.

12. Resin as recited in claim 1 in which said addition polymer is a copolymer of styrene and allyl alcohol.

13. An aqueous dispersion comprising the resin of claim 1 dispersed in water with the aid of a base.

14. An aqueous dispersion as recited in claim 13 further comprising an aminoplast resin.

15. An aqueous electrocoating bath comprising the aqueous dispersion of claim 13 having a resin solids content of from 1–20% by weight, and a pH of at least about 6.

16. An aqueous electrocoating bath as recited in claim 15 in which said bath includes at least 12% by weight of water miscible organic solvent, based on the weight of said resin.

17. An electrocoating bath as recited in claim 16 having dispersed therein a water insoluble aminoplast resin.

18. An electrocoating bath as recited in claim 17 in which said aminoplast resin is a heat-hardening condensate of formaldehyde with benzoguanamine.

References Cited

UNITED STATES PATENTS

| | | | |
|---|---|---|---|
| 3,448,017 | 6/1969 | Chang et al. | 260—18 |
| 3,230,162 | 1/1966 | Gilchrist | 204—181 |
| 3,511,811 | 5/1970 | Conix | 260—475 X |
| 2,932,662 | 4/1960 | Ringwald | 260—475 |

FOREIGN PATENTS

| | | | |
|---|---|---|---|
| 1,106,050 | 3/1968 | Great Britain | 260—18 |
| 1,526,939 | 5/1968 | France | 260—18 |
| 6516561 | 6/1966 | Netherlands | 260—18 |
| 663,219 | 8/1965 | Belgium | 260—18 |

DONALD E. CZAJA, Primary Examiner

C. W. IVY, Assistant Examiner

U.S. Cl. X.R.

204—181; 260—23 S, 29.4 UA, 29.6 H, 29.6 TA